Sept. 30, 1958 J. J. ZIMMERMANN 2,854,512
CLOSE COUPLED TELEPHONE ANSWERING AND MESSAGE RECORDING DEVICE
Filed April 30, 1951
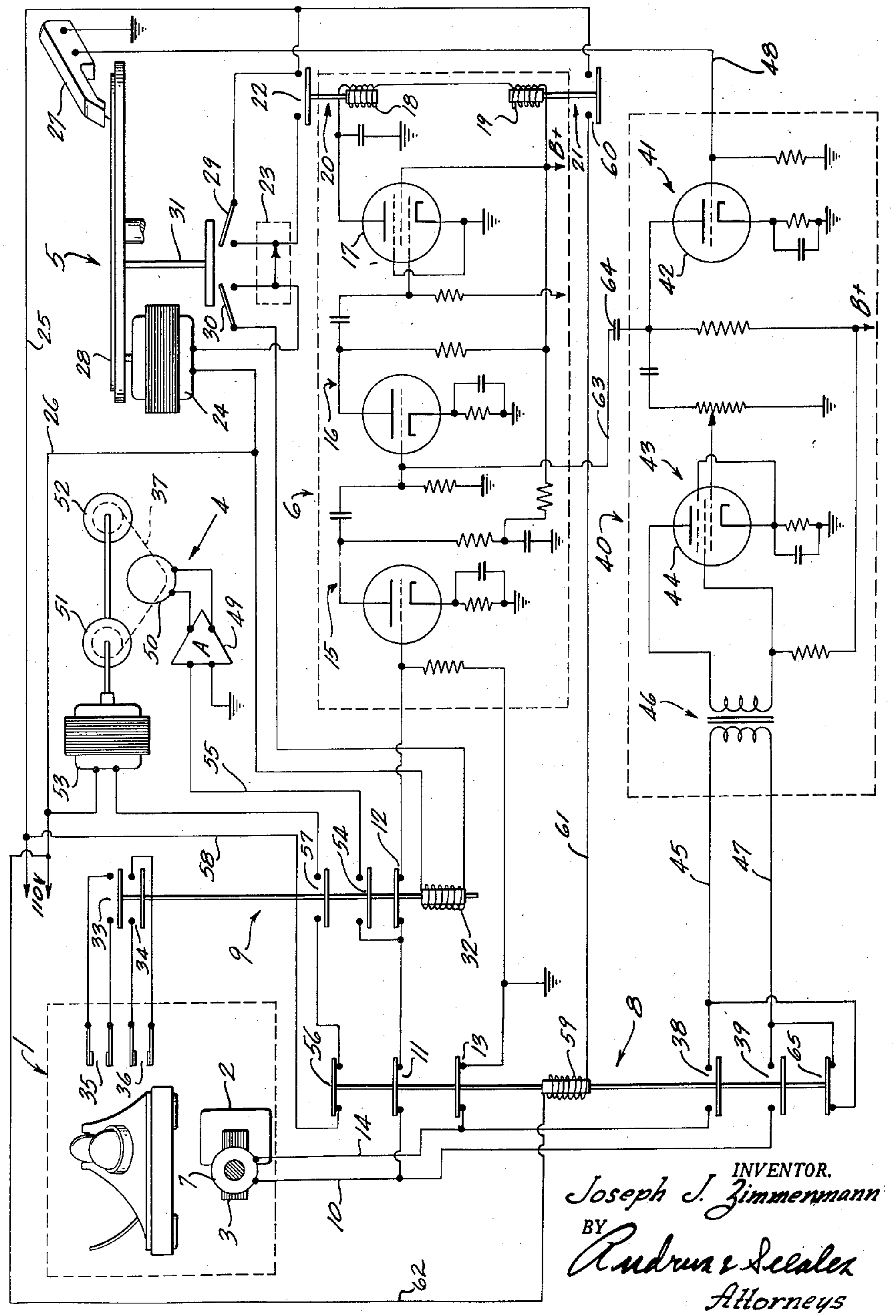
INVENTOR.
Joseph J. Zimmermann
BY
Andrus & Sceales
Attorneys United States Patent Office 2,854,512

Patented Sept. 30, 1958

2,854,512

CLOSE COUPLED TELEPHONE ANSWERING AND MESSAGE RECORDING DEVICE

Joseph J. Zimmermann, Milwaukee, Wis., assignor to Electronic Secretary Industries, Inc., Waukesha, Wis., a corporation of Wisconsin Application April 30, 1951, Serial No. 223,730

15 Claims. (Cl. 179—6)

This invention relates to automatic telephone answering and message recording devices.

An object of the invention is to provide a telephone answerer and message recorder employing but a single coupling coil for transmitting recorded outgoing messages, for recording incoming messages, and for actuating the device upon receipt of a telephone ringing signal.

Another object is to provide an apparatus which is inductively close-coupled with the transformer of a telephone set, thereby improving the message recording and transmitting characteristics of the apparatus without danger of interference with the telephone system in the event of breakdown of the device.

A further object is to provide means for positively preventing the undesirable recording of cross talk and background noise generated in the phonograph and audio amplifier of the apparatus.

Another object of the invention is to provide an apparatus wherein the answering record is utilized to control both the exact period of operation of the incoming message recorder and the interval of operation of the entire device, so that answering records of various types and durations may be used without the necessity of resetting the apparatus and without waste of the recorder record.

A further object is to provide electrical circuits for simulating the telephone set switching action normally accomplished when the handset of a telephone is lifted off the base unit thereof.

The apparatus, in general, consists of a coil disposed in close-coupled relation with the transformer of a telephone set and interconnected with suitable actuating, reproducing and recording apparatus for the purpose of transmitting a previously recorded message over the telephone and recording any message which may be dictated by the maker of the incoming call. In order to permit the cycle of operation of the device to be predetermined when the answering message is recorded, a voice controlled relay is adapted to stop the recorder record when the reproducer is speaking, and a switch is arranged for actuation by the reproducer to shut off the apparatus immediately after all answering messages have been transmitted. Suitable shorting circuits are provided both to prevent cross talk and background noise from being recorded and to effect connection between the telephone set and line without removing the telephone handset from the base unit therefor.

Other objects and advantages of the invention will be set forth more fully in the following description of the embodiment of the invention illustrated in the accompanying schematic drawing.

The invention is adapted to be employed with the usual desk type telephone set 1, having a transformer 2 and a bell unit, not shown, located in the base portion thereof.

The transformer 2, which is customarily constructed with an iron core 3, serves to couple the set 1 with the telephone line, and is accordingly energized by the voice currents of both incoming and outgoing telephone messages.

In order to answer the telephone 1 and record incoming messages when the subscriber is absent, the apparatus is constructed with a recording means such as wire recorder 4, and a means for reproducing previously recorded answering messages, for example, the turntable-type phonograph 5, illustrated in the drawing. The phonograph and recorder are both set in operation upon receipt of an incoming telephone signal by actuating means, including a triggering circuit 6 and other circuits later to be described.

It is an important feature of the invention that all three of the above-mentioned elements, namely the reproducing, recording, and actuating means, be operatively connected with a single sensitive coil 7 mounted within the telephone base or supporting unit and inductively close-coupled with the transformer 2. The coil 7 is preferably of the iron-cored type, with the iron core thereof disposed in engagement with the core 3 of the transformer in order to increase the closeness of the coupling therebetween. The phrase "inductively close-coupled" is intended to denote the interrelation between two elements by means of mutual inductance and with the elements located closely adjacent one another.

During the operative cycle of the apparatus, the first function of coil 7 is to actuate the triggering circuit 6 upon receipt of a ringing signal by the bell unit of the telephone set 1. Although the coil 7 is located adjacent the transformer 2, and is consequently spaced from the bell unit of the telephone, the sensitivity of the coil is such that it is energized by stray flux surrounding the bell unit during ringing.

The voltage thus generated in coil 7 is transmitted to the input of triggering circuit 6 through contacts of both a voice controlled relay 8 and a mechanically controlled relay 9, the operation of which will be described subsequently. This circuit may be traced as follows: A lead 10 connected to one side of coil 7, normally closed contacts 11 of relay 8, normally closed contacts 12 of relay 9, the input of triggering circuit 6, normally closed contacts 13 of relay 8, and a lead 14 connected to the other side of coil 7.

Upon reaching the input of the triggering circuit 6, the voltage from coil 7 is built up by two resistance coupled amplifier stages 15 and 16, until it is of sufficient magnitude to counteract a negative bias on the control grid of a pentode trigger tube 17. Current then flows in the plate circuit of tube 17 and energizes, respectively, the series connected coils 18 and 19 of two relays 20 and 21.

Since the amplifier stages 15 and 16 are of the usual variety utilizing ordinary tubes such as the triodes illustrated, no further description thereof is believed to be necessary. A more complete description of the circuit of the pentode trigger tube 17 may be found in the copending application Serial No. 117,759, filed by the present inventor on September 26, 1949, and assigned to the assignee of the present invention.

The relay 20 is provided with normally open contacts 22 adapted to initiate the energization of both a normally closed safety switch device 23 and the motor 24 of phonograph 5 by a 110 volt power source such as supply lines 25 and 26. When the contacts 22 are closed, during ringing of the ball unit of telephone 1, energizing current flows through a series circuit comprising line 26, phonograph motor 24, safety switch 23, contacts 22, and line 25.

As is more fully described in the copending application previously referred to, the safety switch 23 is adapted to remain closed during the entire normal period of operation of the apparatus. If, however, a breakdown of timing mechanism causes the apparatus to continue in operation for an abnormally long period of time, the switch 23 opens and shuts off the device to insure that the telephone system will not be interferred with. The safety device is preferably constructed with a synchronous motor, not shown, which drives an arm toward the switch to open the same after a predetermined period of time longer than the normal period of operation of the apparatus.

The reproducer 5, which is set in operation upon energization of its motor 24, as described above, may be of any suitable automatic variety. For example, the reproducer illustrated in the drawing is of the phonograph type having a turntable mechanism, not shown, adapted to reset the phonograph tone arm 27 to the outside of the turntable immediately upon completion of the playing of all recorded messages and movement of the tone arm to the center of the turntable.

Because of the method of timing employed in the invention, a record 28 having two messages recorded thereon and spaced from each other by a predetermined interval of silence is provided on the turntable. The first message informs the maker of the incoming telephone call that the called subscriber is absent and requests the caller to dictate any statement which he may desire to leave. After the interval of silence during which the incoming statement is dictated, the second message is played to inform the caller that his time is up.

In cutting such a record, preparatory to using the same on the phonograph 5 of the invention, it is merely necessary to state the first message, pause for the interval of silence while the recorder continues to cut a groove in the record 28, and then state the second message. The record accordingly comprises a band of closely spaced spiral groove portions, representing the two messages and the interval of silence, and a band of the usual widely spaced terminal groove portions adapted to rapidly bring tone arm 27 to the center of the record as soon as the second recorded message has been played.

In order to make the starting and stopping of the entire apparatus dependent upon the condition of the phonograph and record 28 thereon, a pair of normally open blades 29 and 30 of a suitable switch are disposed for actuation by a retractable pin 31 which forms part of a clutch device embodied in the turntable mechanism of phonograph 5. The operation of the turntable mechanism and the retractable pin are fully described in U. S. Patent No. 2,394,539, granted to J. Erwood et al. on February 12, 1946.

For the purposes of the present invention, it is believed sufficient to state that the pin 31 moves downwardly, closing switch blades 29 and 30, when the tone arm 27 is at the periphery of the turntable preparatory to the playing of the first recorded message, whereas the pin moves upwardly and releases blades 29 and 30 as soon as tone arm 27 has moved to the center of the record 28 after the playing of all messages thereon. Accordingly, the period of time during which blades 29 and 30 are closed is approximately equal to the time taken by tone arm 27 to traverse the closely spaced groove portions of the record. In addition to the turntable mechanism described in the patent referred to, many other types of turntables and reproducers may be employed, it being merely necessary to make the switch means 29 and 30 responsive to the length of the two recorded messages plus the interval of silence.

When the apparatus is in its standby condition, that is to say between telephone calls, the tone arm 27 of the phonograph is adjacent the periphery of the record 28, and the retractable pin 31 is in its elevated position. Upon ringing of the bell unit of the telephone to announce an incoming call, the phonograph motor 24 is energized through operation of triggering circuit 6 and relay 20 as previously described. Since this initial energization of motor 24 only lasts for the duration of each ringing signal, it is necessary that a number of rings occur before the turntable mechanism will be driven sufficiently to cause the depression of pin 31 and the engagement of the pickup of tone arm 27 with the outer groove portion of record 28. This delay in the depression of pin 31 is desirable since it prevents actuation of the apparatus by momentary voltage surges in the telephone line.

The closing of switch blade 29 by pin 31 creates a holding circuit which shunts out contacts 22 of relay 20 and makes further energization of the phonograph independent of the telephone ringing signals. This circuit may be traced from power line 26 through phonograph motor 24, safety switch 23, and switch blade 29 to power line 25.

The closing of switch blade 30, simultaneously with the closing of blade 29, causes the energization of the coil 32 of relay 9 by current flowing through a circuit comprising power line 25, blade 29, safety switch 23, blade 30, coil 32, and line 26. Coil 32 being energized, all of the contacts of relay 9 change position and remain in such changed position either until the movement of tone arm 27 to the center of record 28 results in the elevation of pin 31 and the opening of switch blades 29 and 30, or until safety switch 23 opens after an abnormal period of operation caused by sticking of the tone arm 27 or other mishap.

In order to simulate the switching action which occurs when the handset of the telephone 1 is lifted to answer an incoming call, relay 9 is provided with two pairs of normally open contacts 33 and 34 connected, respectively, to close bridging circuits across the usual telephone switches 35 and 36 located inside the telephone base unit. Switches 35 and 36, which are usually of the normally open variety, serve to close the telephone talking circuit and cause cessation of the telephone ringing signals immediately upon being released when the handset is lifted. Accordingly, such action results when contacts 33 and 34 close to bridge or shunt the respective telephone switches, even though the handset is left in position and the switches 35 and 36 remain open.

The telephone 1 being in operative condition with its talking circuit closed, the coil 7 is utilized to perform its second and third functions. The second function of the coil, which follows the actuating function previously described, is to induce into the telephone transformer 2 and thus into the telephone line currents corresponding to the first and second messages on the record 28 of phonograph 5. The third function of the coil 7 is just the reverse, namely the picking up of the voice currents of incoming messages in order to record the same on the record tape or wire 37 of wire recorder 4.

The circuits employed in interconnecting coil 7 with the phonograph and wire recorder, in order that the above-mentioned second and third functions may take place, will next be described.

Included in the circuit leading to phonograph 5 are two pairs of normally open contacts 38 and 39 of the voice controlled relay 8, as well as a suitable audio amplifier 40 adapted to build up the magnitude of voice currents from the pickup of phonograph tone arm 27 prior to the transmittal thereof via coil 7. Amplifier 40, which may be of any suitable type, is shown as having an input stage 41, including a triode 42 and an output stage 43 utilizing a pentode 44. Since the structure and operation of such amplifiers is well known, no further description thereof is believed to be necessary.

The circuit from coil 7 to the output side of amplifier 40 may be traced as follows: lead 14, contact 38, a lead 45, the secondary of the amplifier output transformer 46, a lead 47, relay contact 39, and lead 10. To connect the pickup of tone arm 27 with the input side of amplifier 40, a lead 48 and ground are utilized.

In tracing the circuit from coil 7 to the wire recorder 4, contacts of both the relays 8 and 9 are traversed, and also an audio amplifier 49 adapted to increase the strength of incoming voice currents induced in coil 7 from the telephone transformer 2. The magnified voice currents are recorded by an electromagnetic recording head 50 on the record wire 37, with the wire being moved through the head by a pair of spools 51 and 52 driven by a motor 53.

Starting with coil 7, the circuit to the recording head of wire recorder 4 comprises lead 10, contacts 11 of relay 8, normally open contacts 54 of relay 9, a lead 55, one side of the input of amplifier 49, recording head 50 connected across the output of amplifier 49, the other side of the input of amplifier 49, ground, contacts 13 of relay 8, and lead 14.

The power circuit to the motor 53 of wire recorder 4 is also controlled by both of the relays 8 and 9, namely normally closed contacts 56 of relay 8 and normally open contacts 57 of relay 9. This circuit is traceable from power line 25 through a lead 58, contacts 56 and 57, and motor 53 to power line 26.

As previously described, contacts 57 and 54 of relay 9 remain closed for substantially the entire period of operation of the device due to the functioning of pin 31 of the phonograph turntable mechanism. The circuits to the wire recorder motor 53 and recording head 50 are thus controlled solely by the normally closed contacts 56, 11 and 13 of relay 8 during this entire period. Since relay 8, through its normally open contacts 38 and 39, also controls the circuit between phonograph 5 and coil 7, the phonograph and wire recorder are alternately connected for message transmission and receipt, depending upon whether the coil 59 of relay 8 is in energized or de-energized condition.

To control the energization of coil 59, the relay 21 in the plate circuit of trigger tube 17 is provided with a pair of normally open contacts 60 which are connected in a power circuit comprising line 25, contacts 60, a lead 61, coil 59 of relay 8, a lead 62, and line 26. Relay 21, and thus coil 59 of relay 8, are adapted, by means of the voice control circuit next to be described, to be energized when the phonograph 5 is playing either the first or second messages recorded on record 28.

The voice control circuit includes a lead 63 connected at one end to the grid of the triode in the second triggering amplifier stage 16, and at the other end to the plate of triode 42 of the input stage 41 of the audio amplifier 40. To prevent the impressing of an undesirable direct voltage on the grid of the triode in triggering amplifier stage 16, a blocking condenser 64 is incorporated in lead 63.

Voice currents generated in the pickup of phonograph tone arm 27 are thus amplified both in the input stage 41 of amplifier 40 and in the second stage 16 of triggering circuit 6, after which they are used to counteract the negative bias on the control grid of trigger tube 17, as in the case of ringing signal currents generated in coil 7. Current then flows in the plate circuit of pentode 17 to energize the coil 19 of relay 21 and cause contacts 60 thereof to close.

In order to prevent contacts 60 from opening due to a momentary cessation of voice currents, relay 21 is provided with a copper slug or the like adapted to permit instantaneous closing of the contacts 60 but to retard the opening thereof. Such delay is preferably on the order of a half a second or more.

Although the triggering relay 20 and the voice operated relay 21 are both connected in the plate circuit of pentode 17, there is no interference between the voice control and triggering operations of the apparatus. Currents generated in coil 7 cannot interfere with voice control since contacts 12 of relay 9 are open when the phonograph is speaking. Similarly, voice control cannot interfere with the triggering operation of coil 7, since the power circuit controlled by contacts 60 of relay 21 passes through contacts 57 of relay 9, and such contacts are open when the telephone bell is ringing prior to actuation of the device.

In the operation of the voice controlled elements of the device, currents corresponding to the first message recorded on phonograph record 27 are amplified in amplifier 40 and transmitted to coil 7 via contacts 38 and 39 of relay 8. From coil 7 the currents are induced into the transformer 2, and thus into the telephone line, to informs the maker of the incoming call that the subscriber is absent and to request that a message be dictated.

Contacts 38 and 39 of relay 8 are closed during this interval due to the voice control operation wherein contacts 60 of relay 21 remain closed, while the phonograph 5 is talking. In addition, the wire recorder 4 is inoperative due to the opened condition of contacts 56, 11 and 13 of relay 8, so that none of the record tape 37 is wasted or used in the undesired recording of outgoing messages.

As soon as the first message on record 28 has been played, so that the phonograph pickup is in the interval of silence separating the first and second recorded messages, contacts 60 of relay 21 open and de-energize relay 8. Phonograph 5 is then disconnected from the coil 7, due to the opening of relay contacts 38 and 39, and wire recorder 4 is made operative by the closing of contacts 56, 11 and 13.

Currents of the incoming telephone message, induced in coil 7 from transformer 2, are then transmitted to the recording head 37 via relay contacts 11, 13 and 54 and amplifier 49. After the recording of the incoming message on the record wire 37, the second message on phonograph record 28 commences to play and causes the energization of relay 8 for transmittal of this second message as in the case of the first one.

In practice it has been found that, in spite of the contacts 38 and 39 which disconnect the amplifier 40 from coil 7 during recording of incoming messages, a considerable amount of cross talk and background noise generated in amplifier 40 is recorded on the record wire 37. Accordingly, a pair of normally closed contacts 65 are provided on relay 8 and connected across leads 45 and 47 in a shorting or squelching circuit.

The output of amplifier 40 is thus short circuited at all times when the wire recorder 4 is operating, but is not short circuited when relay 8 is energized to permit transmittal of the outgoing recorded message. Such short circuiting effectively prevents the recording of undesirable noises and results in a clear and true recording of incoming telephone messages.

The following is a brief description of the operation of the apparatus.

To install the device, it is merely necessary to mount the coil 7 inside the telephone base unit and in inductively close-coupled relation with transformer 2, and also to connect relay contacts 33 and 34 across the respective telephone switches 35 and 36. The cabinet containing the various elements may be positioned a considerable distance from the telephone and in any convenient or desirable location. The telephone may at all times be used manually and in the ordinary manner, even when the apparatus is set for automatic operation.

When the telephone subscriber is about to leave his office, he selects a record having the desired messages recorded thereon, and places the same on the turntable of phonograph 5. He then turns a switch, not shown, which energizes the power supplies of the various elements and places the apparatus in a standby condition for automatic operation.

As soon as the bell unit of the telephone 1 rings to announce an incoming call, current induced in coil 7 by leakage flux from the telephone bell unit is utilized to set off the triggering circuit 6 and cause relay 20 therein to close its contacts 22. The phonograph motor 24 is thus energized, and operates after several rings of the telephone to cause the retractable pin 31 of the phonograph turntable mechanism to depress and close switch blades 30 and 29.

The closing of switch blades 30 and 29 causes the energization of relay 9, so that contacts 33 and 34 thereof close and operatively connect the telephone 1 with the telephone line for transmission and receipt of telephone messages. Blade 29, in closing, completes a holding circuit which maintains the energization of phonograph motor 24. The phonograph 5 accordingly plays the first message recorded on record 28, that is to say, the message giving information to the maker of the incoming call and requesting that a message be left.

While this first message is being played, voice currents flowing from the phonograph and through lead 63 between the audio amplifier 40 and triggering circuit 6 cause relay 21 to close its contacts 60 and thereby shift the contacts of relay 8. Simultaneously, these voice currents flow to coil 7 via contacts 38 and 39 of relay 8, and are induced into the telephone line and to the maker of the incoming call.

As soon as the completion of the first recorded message causes cessation of voice currents to relay 21, relay 8 shifts its contacts and places the wire recorder 4 in operation. The coil 7 is then connected to the wire recorder and not to the phonograph, and an incoming message is recorded on record wire 37 during the interval of silence on the phonograph record 28.

At the end of the interval of silence, the second message on record 28 commences to play and again causes energization of relay 21 and consequent shifting of the contacts of relay 8. The pickup of phonograph tone arm 27 being thus connected through amplifier 40 to coil 7, the second recorded message is induced into the telephone transformer and system to inform the maker of the incoming call that his time is up.

The tone arm 27 then moves along the widely spaced groove portions to the center of record 28, resulting in the elevation of pin 31 and the opening of switches 29 and 30. The phonograph motor 24, as well as all of the various relays of the apparatus, are thus de-energized until another incoming call is made to cause repetition of the cycle. Should sticking of the tone arm prevent pin 31 from elevating, safety switch 23 will open and de-energize the device to insure opening of relay contacts 33 and 34 and consequent disconnection of the telephone from the telephone line.

The tone arm 27 is reset to the outside of the record partly by residual motion in the turntable mechanism after the de-energization of the phonograph motor 24, and partly as a result of current flowing in the motor 24 during ringing of the telephone bell unit.

Upon his return to the office, the subscriber turns a switch, not shown, which prevents further automatic operation of the device. The same or other switches are also employed to cause the wire recorder 4 to play back all messages that have been recorded during the various cycles of operation of the apparatus.

The described telephone answering and message recording device features an improved quality of message recording and transmission without the service difficulties which would arise if the phonograph and wire recorder were directly connected to the telephone line instead of inductively close-coupled thereto. Because of the method of timing and voice control employed under the invention, a wide variety of lengths and types of recorded answering messages may be used without the necessity of resetting cams or other timing mechanisms such as are frequently employed on telephone answering devices.

Various embodiments of the invention may be employed within the scope of the following claims.

I claim:

1. In a telephone answering and message recording device, an answering record with a starting groove portion and a recorded answering message thereon, a reproducer for said record connected to a telephone to transmit said previously recorded answering message thereover, a recorder operably associated with said telephone to record incoming telephone messages, means responsive to an incoming telephone signal including contact means to close the talking circuit of said telephone and set said reproducer and recorder into operating condition, the starting groove portion of said record delaying the transmission of the answering message until the talking circuit of said telephone is closed, and a voice controlled relay connected to said reproducer and said recorder and responsive to the condition of said reproducer to stop said recorder during playing of the recorded answering message by said reproducer, said arrangement operating to prevent waste of the recorder record and insure against the undesired recording of outgoing messages.

2. In a telephone answering and message recording device, an answering record with a previously recorded answering message thereon, a reproducer for said record connected to a telephone for transmittal thereover of messages recorded on said answering record, a recorder operably associated with said telephone for recording of incoming messages on a record, means responsive to incoming telephone ringing signals including contact means to close the talking circuit of said telephone and set said reproducer and recorder in operation, and a voice controlled relay connected to said reproducer and said recorder and to said telephone and responsive to the playing of said messages recorded on said answering record through said reproducer to stop the movement of said recorder record during said playing, said arrangement operating to prevent waste of said recorder record due to movement thereof during playing of outgoing answering messages.

3. In a telephone answering and message recording apparatus, a record with two recorded messages thereon separated by an interval of silence, a reproducer having a turntable for said record and having an output circuit associated with a telephone to transmit said two previously recorded answering messages thereover, a recorder operably associated with said telephone to record incoming telephone messages, means responsive to a ringing signal of said telephone to actuate means to close the talking circuit thereof and set said reproducer and recorder into operating condition, voice controlled means connected to said reproducer and said recorder and responsive to the playing of said recorded answering messages to prevent said recorder from operating during said playing and to permit operation of said recorder during said interval of silence, and switch means responsive to the turntable mechanism of said reproducer upon the completion of the playing of both of said recorded messages to open the talking circuit of said telephone and to shut off said reproducer and said recorder.

4. In a telephone answering and message recording device adapted for use with a phonograph record comprising a plurality of closely spaced groove portions and separate starting and terminal groove portions, said closely spaced groove portions having recorded thereon a first message and a second message separated from said first message by an interval of silence; a recorder connected by an electrical circuit with a telephone to record an incoming telephone message, a phonograph connected by an electrical circuit with said telephone to transmit said first and second recorded messages thereover, said phonograph including a pickup adapted to travel in said starting groove portion to engage said pickup with the closely spaced groove portion of said record and to rapidly move along said terminal groove portion to the center of said record immediately upon completion of the playing of said second message, means responsive to an incoming telephone signal and connected to said reproducer and said recorder and to said telephone by an electrical circuit to close the talking circuit of said telephone and to set said phonograph and recorder in operation, a voice controlled relay responsive to the playing of said first and second recorded messages and adapted to stop the operation of said recorder during said playing, and a switch responsive to the turntable mechanism of said reproducer upon the movement of said pickup to the center of said record by said terminal groove portion of said record and connected to open the talking circuit of said telephone, whereby the duration of said interval of silence is determinative of the length of the recording period and waste of the recorder record due to motion thereof during playing of said first and second messages is prevented and said device is directly controlled by the mechanical grooves of said record.

5. In a telephone answering and message recording apparatus, a record with two previously recorded answering messages thereon, a reproducer having an output circuit associated with a telephone to transmit said two previously recorded answering messages thereover, said answering messages being separated from each other by a predetermined interval of silence, a recorder connected with said telephone to record incoming telephone messages, means responsive to a ringing signal of said telephone, an electrical circuit connected to said last named means and said telephone and said reproducer and said recorder to close the talking circuit of said telephone and set said reproducer and recorder into operating condition, voice controlled means connected to said reproducer and responsive to the playing of said recorded answering messages to prevent said recorder from operating during said playing and to permit operation of said recorder during said interval of silence, means responsive to the completion of the playing of both of said recorded messages to open the talking circuit of said telephone, and safety timing means connected to said reproducer to open said telephone talking circuit in the event of failure of operation of said last named means.

6. In an automatic telephone answering apparatus for use with a telephone having a handset and a separate base portion, said base portion containing a coupling transformer connected with the telephone line and energized by the voice currents of outgoing telephone messages, a record with a recorded answering massage thereon, a reproducer adapted to play a previously recorded answering message from said record, and a coil electrically connected with the output of said reproducer and mounted within said base portion in inductively close-coupled relation with said transformer, said coil being operable to induce said answering message into said transformer and thus into the telephone line with improved quality of message transmittal and without danger of interference with the telephone system in the event of breakdown of the apparatus.

7. In an automatic telephone answering apparatus for use with a telephone having a handset and a separate base portion, said base portion containing an induction means connected with the telephone line and energized by voice currents of both incoming and outgoing telephone messages, a record with previously recorded answering messages thereon, a reproducer adapted to play previously recorded answering messages from said record for transmittal over said telephone, a recorder adapted to record messages dictated by the maker of the incoming call, and a coil electrically connected with the output of said reproducer and the input of said recorder and mounted within said telephone base portion in inductively close-coupled relation with said induction means, said coil operating both to induce said answering messages into said induction means and to pick up said dictated incoming messages from said induction means for improved quality of message transmittal and recording without danger of interference with the telephone system in the event of breakdown of the apparatus.

8. In an automatic telephone answering apparatus for use with a telephone having an electromagnetically operated bell element and an induction element, both of said elements being connected with the telephone line for energization, respectively, by telephone ringing currents and by voice currents of both incoming and outgoing telephone messages, a record with previously recorded messages thereon, a reproducer adapted to play previously recorded answering messages from said record for transmittal over said telephone, a recorder adapted to record messages dictated by the maker of the incoming call, an actuating circuit adapted upon receipt of a voltage impulse to set said reproducer and recorder in operation, and a single coil inductively coupled with said bell element and induction element, said coil being electrically connected to said actuating circuit for transmittal of voltage impulses thereto during energization of said bell element, to said reproducer for induction of said recorded answering message into said induction element and thus into the telephone line, and to said recorder for recording of said dictated incoming messages induced into said coil from said induction element.

9. In an automatic telephone answering apparatus for use with a telephone having a handset and a separate base portion, said base portion containing an induction means connected with the telephone line and energized by the voice currents of both incoming and outgoing telephone messages, a record having a previously recorded message thereon a reproducer adapted to play a previously recorded answering message from said record, a recorder adapted to record messages dictated by the maker of the incoming call, a coil positioned within said base inductively coupled with said induction means and connected in circuit with said reproducer and with said recorder, and means to stop the recording action of said recorder during playing of said answering message but to permit said recorder to operate during intervals when no answering message is being played, said arrangement operating to prevent waste of the recorder record through undesired recording of said outgoing answering message.

10. In an automatic telephone answering apparatus for use with a telephone having a handset and a separate base portion, said base portion containing an induction means connected with the telephone line and energized by the voice currents of both incoming and outgoing telephone messages, a record with a previously recorded answering message thereon a reproducer adapted to play a previously recorded answering message from said record, a recorder adapted to record messages dictated by the maker of the incoming call, a coil inductively coupled with said induction means and electrically connected with said reproducer and recorder, means connected to said reproducer and said telephone and said recorder and operable upon receipt of an incoming telephone signal to close the talking circuit of said telephone and place said reproducer and recorder into operating condition, and voice controlled relay means connected to control the respective circuits between said coil and said reproducer and recorder, said relay means being responsive to the playing of said recorded answering message to first open the circuit to said recorder during said playing and then open the circuit to said reproducer after said playing for alternate transmittal of said outgoing answering message and recording of said dictated incoming message.

11. In an automatic telephone answering and message recording device, a recorder coupled with a telephone and adapted to record an incoming telephone message on a record, a record with a message recorded thereon a reproducer coupled with said telephone and adapted to transmit a previously recorded outgoing message thereover, the circuit between the pickup of said reproducer and said telephone including a means to amplify the voice currents of said outgoing message, a triggering and amplifying circuit connected to said reproducer and said recorder and operable to set said recorder and reproducer in operation means connected to said triggering and amplifying circuit to actuate the same upon receipt of a ringing signal by said telephone, relay means connected in said triggering and amplifying circuit and operable to stop and start the record of said recorder, and a lead connecting said circuit between said pickup and telephone with said triggering and amplifying circuit to cause actuation of said relay means and stopping of said recorder record during playing of said recorded outgoing message, the connection of said lead being such that voice control of said relay means is achieved without the necessity of employing amplifying means other than those normally present in said circuits.

12. In an automatic telephone answering apparatus for use with a telephone having a handset and a separate supporting unit for said handset, said supporting unit containing a telephone switch normally operable by the lifting of said handset to close the talking circuit of said telephone; a record on which has been cut a recorded message, a reproducer connected with said telephone to transmit a previously recorded message thereover, a circuit connected to said telephone switch and having switch means therein to short circuit the telephone switch and thereby to simulate the telephone switching action normally accomplished by the lifting of said handset, and means responsive to an incoming telephone ringing signal including an actuating circuit connected to said reproducer to set said reproducer in operation and actuate said switch means for transmittal of said recorded message over the talking circuit of said telephone.

13. In an automatic telephone answering and message recording device, a recorder coupled with a telephone and adapted to record an incoming telephone message on a record, a record with a recorded message thereon a reproducer coupled with said telephone and adapted to transmit a previously recorded outgoing message thereover, the circuit between the pickup of said reproducer and said telephone including an audio amplifier to strengthen the voice currents of said outgoing message, and a switch connected across the output of said audio amplifier, said switch being adapted to short circuit said audio amplifier output during recording of said incoming message to prevent the recording on said record of noise generated in said audio amplifier.

14. In an automatic telephone answering and message recording apparatus for use with a telephone having an induction element connected with the telephone line and energized by the voice currents of incoming and outgoing telephone messages, a record with two previously recorded messages thereon a reproducer adapted to play a record having two answering messages recorded thereon and separated from each other by an interval of silence, a recorder adapted to record incoming telephone messages on a record, a coil mounted in inductively close-coupled relation with said induction element, electric circuits connecting said coil with said reproducer and with the recording head of said recorder, means to stop and start the movement of said recorder record, and a relay responsive to the playing of said answering messages and connected to control said circuits and said recorder record starting and stopping means, said relay being operable during the playing of said two answering messages to stop said recorder record, open the circuit between said coil and said recording head, and close the circuit between said coil and said reproducer, and during the interval of silence separating said answering messages to start said recorder record, close the circuit between said coil and said recording head, and open the circuit between said coil and said reproducer.

15. In a device of the class described, a sound recording, a reproducer adapted to translate the sound recording into electrical current impulses, an electrical circuit connected to said reproducer to receive said electrical current impulses therefrom and to transmit the same as an outgoing message over a telephone line, a recorder associated with said electrical circuit to record an incoming message from the telephone line, and means responsive to a current change in said circuit upon completion of the outgoing message from said recording to initiate actuation of said recorder.

References Cited in the file of this patent

UNITED STATES PATENTS

| | | |
|---|---|---|
| 1,454,157 | Egerton | May 8, 1923 |
| 2,005,788 | Keiser | June 25, 1935 |
| 2,100,434 | Davis | Nov. 30, 1937 |
| 2,328,562 | Lesavoy | Sept. 7, 1943 |
| 2,384,604 | Dann | Sept. 11, 1945 |
| 2,539,139 | Jordanoff et al. | Jan. 23, 1951 |
| 2,549,548 | Von Zimmermann | Apr. 17, 1951 |
| 2,673,242 | Van Deventer | Mar. 23, 1954 |
| 2,724,015 | Van Deventer et al. | Nov. 15, 1955 |